United States Patent

[11] 3,614,216

[72] Inventor Sol Roy Rosenthal
  230 E. Delaware Place, Chicago, Ill. 60611
[21] Appl. No. 847,871
[22] Filed Aug. 6, 1969
[45] Patented Oct. 19, 1971
  Continuation-in-part of application Ser. No. 797,958, Feb. 10, 1969, now abandoned.

[54] VISION-AIDING DEVICE
  10 Claims, 16 Drawing Figs.
[52] U.S. Cl. .................................................. 351/44,
  2/14 J, 351/46, 351/54, 351/63, 351/120, 351/130
[51] Int. Cl. .................................................. G02c 7/10,
  G02c 7/16
[50] Field of Search .......................................... 351/41, 44,
  45, 46, 47, 48, 49, 54, 63, 111, 113, 115, 120, 130,
  136; 2/12, 13, 14, 14.1, 14.2, 14.3, 14.4, 14.8,
  14.9, 14.22

[56] References Cited
UNITED STATES PATENTS

| | | | |
|---|---|---|---|
| 250,462 | 12/1881 | Taxis | 351/115 |
| 715,533 | 12/1902 | Anderson | 351/111 X |
| 1,048,191 | 12/1912 | Maurice | 2/13 X |
| 2,179,286 | 11/1939 | English | 351/49 X |
| 2,975,426 | 3/1961 | Rabb | 351/111 X |
| 3,155,982 | 11/1964 | Baratelli | 351/123 X |
| 3,395,964 | 8/1968 | Chartrice | 351/63 |

FOREIGN PATENTS

| | | | |
|---|---|---|---|
| 1,026,839 | 4/1966 | Great Britain | 351/46 |

Primary Examiner—David Schonberg
Assistant Examiner—John W. Leonard
Attorney—Luedeka, Fitch, Even & Tabin ABSTRACT: Sunglasses or eyeglasses made of an elongated sheetlike member of a flexible transparent material having a memory sufficient to bias it to coil itself into a roll shape whenever untensioned. End portions are shaped to fit in the orbito-temporal fossae of the human head at a location just behind the zygomatic process. For a sunshade, the device may be inverted. For eyeglasses, the member is provided with opaque regions located in the path of vision of the wearer, and a plurality of apertures between about 0.025–0.036 inch in diameter are provided in these opaque regions in rows spaced-apart between 0.1 inch and 0.17 inch. Variations in the shape and form of the end portions as well as additional nose bridge anchors are utilized to provide stability and comfort for the wearer.

PATENTED OCT 19 1971 3,614,216

INVENTOR
SOL ROY ROSENTHAL

Anderson, Luedeka, Fitch, Even, & Tabin
ATTYS.

INVENTOR
SOL ROY ROSENTHAL

ATTYS.

PATENTED OCT 19 1971 3,614,216

INVENTOR
SOL ROY ROSENTHAL

Anderson, Luedeka, Fitch, Even, Tabin
ATTYS.

VISION-AIDING DEVICE

This application is a continuation-in-part of my earlier application Ser. No. 797,958, filed Feb. 10, 1969, now abandoned.

The present invention generally relates to improved devices for aiding human vision, to improved devices for filtering out harmful rays from the sun or other sources of light, and more particularly to flexible devices of this general type which are anchored or stabilized in the natural recesses or grooves of the skull and when not in use, are adapted to be stored in compact form.

Practically all eyeglasses now in use are composed of several different parts and several different materials. Thus the frames are made of metal or plastic, the lens of glass or plastic, the temple pieces of metal or plastic, etc. The latter are hinged to the frames by screws or the like which are frequently the points of least resistance so that they become loosened or fractured. The present method of stabilization or anchoring of eyeglasses is mainly by the inclusion of loops on the terminal posterior of the temple pieces which fit about the ears.

Storage of the currently used eyeglasses is another problem. In order to avoid breakage or distortion of the eyeglasses, rather large and sometimes rigid receptacles are needed which are cumbersome to store in the pocket or purse. Accordingly, improved devices which do not present the storage problems of conventional eyeglasses when not being worn are desired.

It is an object of the present invention to provide improved devices for aiding human vision. A further object is to provide eyeglasses composed of a one-piece flexible member, thus eliminating the use of multiple elements, such as frames, temple pieces, hinges, etc. Another object is to provide eyeglasses which are anchored or stabilized in natural recesses of the skull, close to the eyes, thus eliminating temple pieces. A still further object is to provide a flexible device which is capable of storage in compact form in a suitable small receptacle.

These and other objects of the invention will be apparent from reading the following specification and the associate drawings which illustrate various embodiments of the invention wherein.

Figure 1:
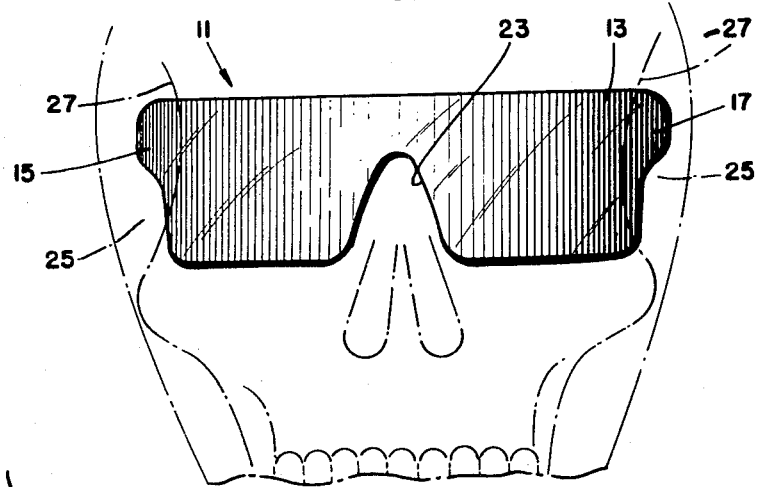
FIG. 1 is a front elevational view of a device embodying various features of the invention, shown fitted in place on the head of a wearer.

As illustrated in FIGS. 1 through 4, a device 11 is shown which is designed to serve the function of sunglasses. The device 11 constitutes an elongated flexible band 13 of thermoplastic material or the like which is proportioned to fit horizontally across the front of the human face as illustrated in FIG. 1. When the device is designed to serve the function of sunglasses, the material from which it is made should contain a sufficient amount of an appropriate pigment to filter out the bright and harmful rays of the sun or artificial light, thus reducing glare and discomfort to the eyes under conditions of exposure to bright sunlight or artificial light. In addition to being adapted for design to fulfill the sunglasses function, the device 11 might be made to provide a brightening effect, as by using a bright yellow pigment. Such yellow-colored devices are used by skiers and other persons active in snow-covered terrain in order to give better definition of the landscape on a gray or overcast day.

Figure 4:
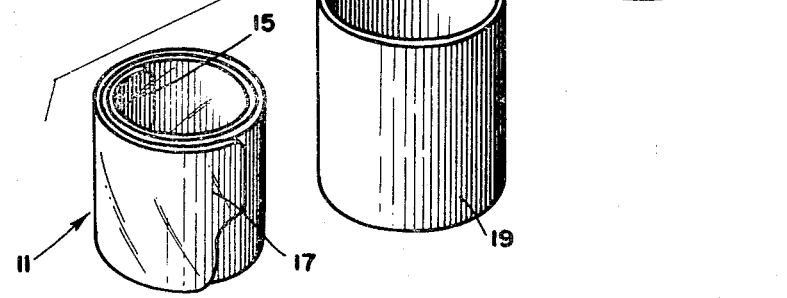
FIG. 4 is a composite view of the device as shown in FIGS. 1 through 3 in a condition for storage when it is not being worn, together with a suitable storage container.

The device 11 is an elongated one-piece, flexible member or band 13 that is formed with outer end or temple portions 15 and 17. The band 13 is preferably formed from a roll of thin, flexible thermoplastic material, and it is important that it retains its memory as a roll. As a result, whenever the band 13 is untensioned, it automatically coils itself in the shape of a hollow cylinder, as shown in FIG. 4. Accordingly, the self-coiling device 11 can easily be stored in a tubular container 19 that can be closed by snapon cap 21 or the like. Thus, when the device 11 is not being worn it can be simply slipped into the container 19 and conveniently stored in the pocket of the wearer. Instead of being made from a roll of thermoplastic material, the band 13 can be cut from a flat sheet and then heat-treated after cooling to provide the desired memory in the device 11.

Figures 2, 3:
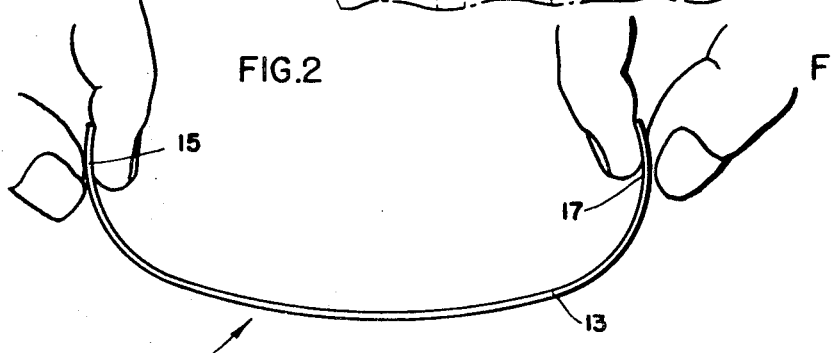
FIG. 2 is a plan view of the device as shown in FIG. 1 depicted in the form in which it takes when held immediately prior to being fitted in place on the head of a wearer.
FIG. 3 is a side elevational view of the device as shown in FIG. 2.

When the device 13 is uncoiled for wearing, it takes the general shape shown in FIG. 2, as the user prepares to fit it upon his face. As shown, the user grasps the device near each of its temple portions 15 and 17 with the thumb and forefinger of both hands, unrolling the device to nearly its full length. At a location generally intermediate the ends, an upwardly extending indentation or bridge 23 is formed in the band 13 to accommodate and fit over the nose of the wearer, as shown in FIG. 1.

The right- and left-temple portions 15 and 17 have a lesser height than the main portion of the band, and the corners of the temple portions are rounded. As shown in FIG. 1, the band is of sufficient length to span the wearer's face and is dimensioned to be of sufficient height to extend vertically above and below the level of his eyes. Generally, the width of the band will be about two inches for adults and may be narrower for children, for example, about an inch wide. However, for cosmetic reasons the width of the band may be up to four inches or more.

Figure 6:
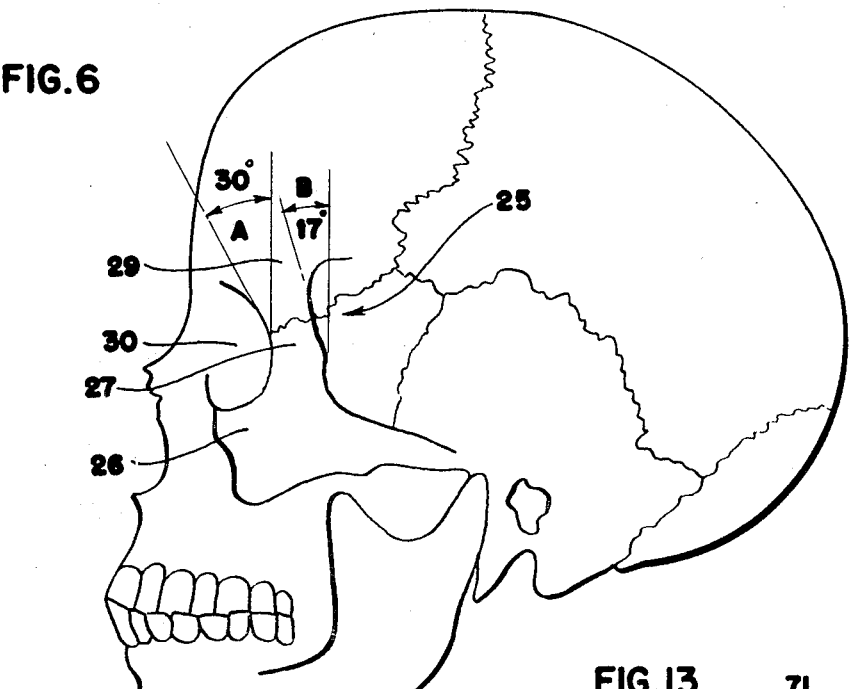
FIG. 6 is a side view of a human skull.

The right- and left-temple portions 15 and 17 are dimensioned and shaped to fit in the fossae of the wearer behind the zygomatic process 27 which is formed by the zygomatic and frontal bones, 26 and 29 respectively, hereinafter referred to as the orbito-temporal fossae 25, as shown in FIG. 6. Generally, the temple portions 15, 17 should have a height between about one-half inch and about 2 inches in order to fit snugly and comfortably in the orbito-temporal fossae. Moreover, the curvature of the temple portions 15, 17, which results from the inherent memory provided by its method of manufacture, is such that each temporal portion extends over and resides just behind the zygomatic process 27, which is located just lateral of the orbit 30. The inherent resiliency and memory of the thermoplastic material insures that very slight pressure is maintained between the terminal portions and the sides of the wearer's head in the region of the orbito-temporal fossae, and in this manner, the device 11 is adequately secured to the wearer's head.

The construction of the device 11 inherently overcomes problems previously encountered when wearing sunglasses or spectacles which employed conventional temple pieces. The necessity for fitting temple pieces to the head and ears of the individual wearer is obviated as well as potential future problems of loose or broken temple hinges. However, it is considered important, from the standpoint of assuring both the comfort of the wearer and the stability of the device in place on the wearer, that the thermoplastic material from which the device 11 is made have the desired flexibility and memory. In this respect, the overall length of the band 13 will probably approximate 7 to 8 inches for adults and 5 to 6 inches for children. The thickness of the band will be determined somewhat by the thermoplastic material chosen, and any suitable transparent material may be used, such as one of the vinyls, polystyrene, or polymethylmethacrylate. Generally, a band 13 having a thickness of about seven to 30 thousandths of an inch (0.007 inch to 0.030 inch) will be used.

The amount of tension inherently built into the device 11 is a function both of the resilience of the thermoplastic chosen and the rightness with which the memory will coil the untensioned device. It has been found that, for most thermoplastic materials having a thickness of about 0.007 to 0.030 of an inch, the band 13 should have a sufficient memory to coil it into the shape of a hollow cylinder having an outer diameter between about one-half inch and 2½ inches. If the device 11 maintains a memory of about this characteristic, both comfort for the wearer and stability of the device 11 in place during use are provided. If a thickness of about 0.030 inch is used, it may be desirable to form the band to coil from each end simultaneously, thus producing a pair of adjacent coils having an overall oval shape which can be fit into an oval-shaped container for storage.

Figure 5:
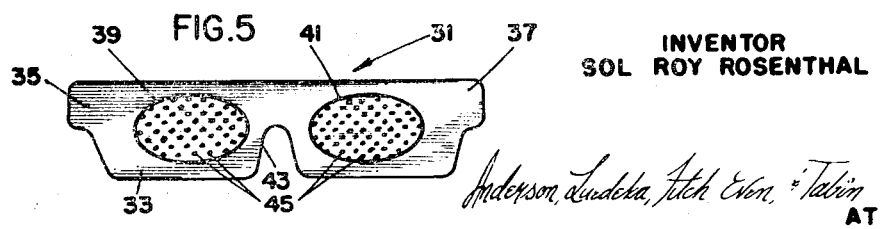
FIG. 5 is an alternative embodiment of a device somewhat similar to that as shown in FIG. 1.

In FIG. 5, an alternative embodiment of the invention is illustrated which is designed to serve as an inexpensive device 31 for improving the visual acuity of a wearer suffering from an eye condition such as myopia, hyperopia, or prespyopia. The device 31 includes a flexible resilient band or member 33, which is generally the same in size and shape as the band 13 described above. The band 33 has temple or end portions 35 and 37 which are essentially the same as the temple portions 15 and 17 described above. The device 31 has two opaque regions 39 and 41 which are located on opposite sides of the indentation or bridge 43 for the nose. When the device 31 is in place on the face of the wearer, the opaque regions 39 and 41 are located directly over the optic fossae or eyesockets of the wearer. As can be seen in FIG. 5, the opaque regions are elliptical, having major axes which extend horizontally and are preferably about 2 inches long. The minor axes extend vertically to a height of between an inch and 1½ inches.

The regions 39 and 41 are suitably rendered opaque. For example, if the overall band of thermoplastic material 33 is transparent, a dye or pigment may be impregnated into the regions 39 and 41. Alternatively, a layer or film of an opaque substance may be applied to the outer and/or inner surfaces of the band in the regions 39 and 41. Moreover, the opaque regions 31, 41 might be made separately of suitable opaque flexible material and then set into openings which have been cut in the band 33. If desired for some purpose, the entire band 33 might be made of opaque material.

A plurality of appropriately spaced-apart viewing apertures 45 extend through the device 31 in each of the opaque regions 39 and 41. The apertures are cylindrical, of circular cross section, and extend perpendicularly to the plane of the sheetlike material from which the band 33 is constructed. The apertures 45 are circles having diameters between about 0.024 and 0.036 inch, and preferably, the diameter of each aperture 45 is about 0.035 inch.

The function of each aperture 45 is to closely surround the visual axis of the eye in one position thereof in order to restrict the incidence of light which reaches the center of the pupil. The apertures 45 are provided in a plurality of horizontal and vertical rows, and the apertures in each of the rows are staggered with respect to the apertures in the next adjacent rows. As illustrated, the apertures 45 in one vertical row are located midway between the apertures in the next adjacent row. The distance between rows should be between 0.1 inch and 0.17 inch, center to center, and preferably it is about 0.12 inch. It has been found that such a construction enables the wearer to view objects in different directions with the eyes in corresponding positions, the wearer selecting an appropriate aperture in each of the opaque areas for viewing. Spacing of the apertures in this manner assures that the vision is not substantially affected by light entering through another aperture and thus avoids double vision.

FIG. 6, in addition to illustrating the relative positions of the bone structures which provide the anchoring areas for the present embodiments of the invention, also shows the angles A and B formed by the anterior and posterior aspects of the zygomatic process 27. These angles, A and B, measure approximately 30 and 17 degrees with the vertical, respectively, and as discussed hereinafter, are taken into account in connection with various of the other embodiments of the vision-aiding devices shown to obtain a tighter, more stable fit.

Figure 7:
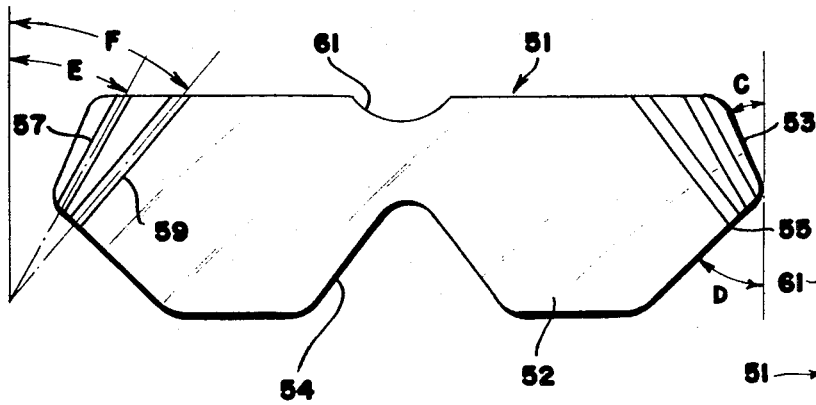
FIG. 7 is a front elevational view of another embodiment of a device showing various features of the invention.
Figure 9:
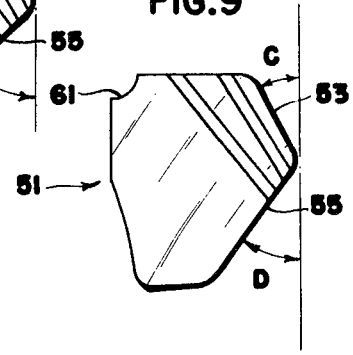
FIG. 9 is a right side elevation of the device as shown in FIG. 7.
Figure 8:
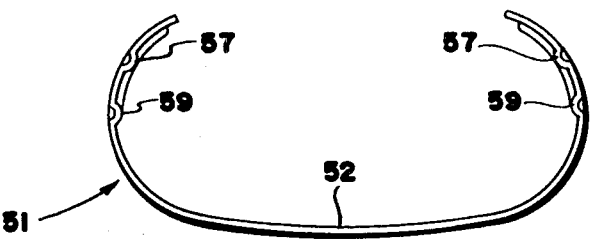
FIG. 8 is a plan view of the device as shown in FIG. 7.

FIGS. 7 through 9 illustrate an alternative and preferred embodiment of a vision-aiding device 51. The device 51 comprises an elongated flexible band 52 of thermoplastic material proportional to fit horizontally across the front of the human face. In its normal position, when being used as sunglasses, the device 51 fits horizontally across the eyes of the wearer, nose indentation 54 fitting over the bridge of the nose, and upper holding edge 53, cut at an optimum angle of 17° ± about 5° with the vertical (Angle C in FIGS. 7 and 9), fitting in the orbito-temporal fossae of the head. This approximately 17° angle allows comfort while producing excellent stability and effectiveness for the wearer. This effectiveness is explained anatomically by the fact that the 17° angle follows that of the posterior aspect of the zygomatic process 27, as shown in FIG. 6. In actual experiments, the angle B was found to be on the average of about 17° from the vertical.

Ridges 57 and 59 are optional and may be molded into the temple portions of the device to facilitate adjustment of the device out of the wearer's path of vision when he is reading. Ridge 57 is molded at a typical angle of about 35° with the vertical (Angle E in FIG. 7) allowing the wearer to moderately tilt the device on his head while maintaining its secure fit. Ridge 59 is molded at an angle of about 45° with the vertical (Angle F in FIG. 7) allowing a greater degree of tilt and direct reading without removal of the device from the head. The ridges may be positioned within the range of about 25° to 50° with the vertical to facilitate reading ease.

Figure 10:
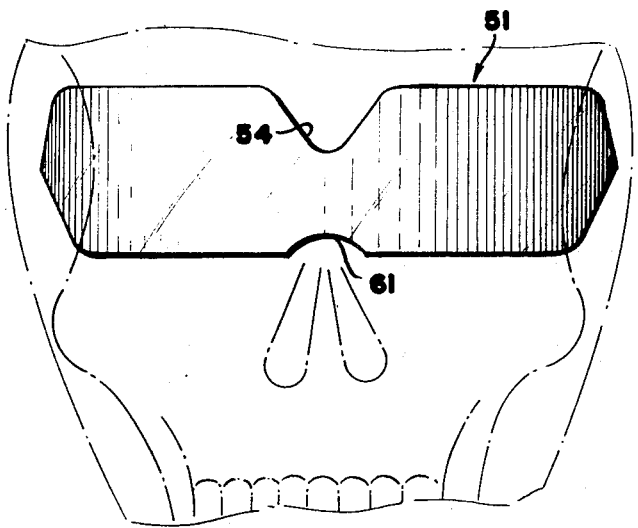
FIG. 10 is a front elevational view of a variation of the device shown in FIG. 7, shown in its alternative inverted position on the head of the wearer.
Figure 11:
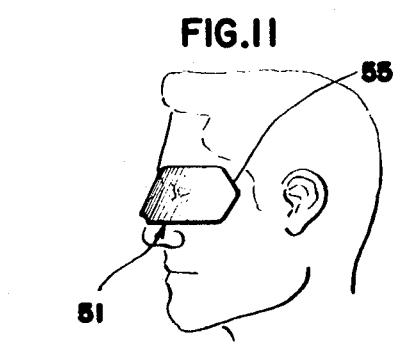
FIG. 11 is a side view of the human head illustrating the device in its alternative position as shown in FIG. 10.

FIGS. 10 and 11 illustrate the alternative use of device 51 as a sunshade. When used for this purpose, the device 51 is inverted with shallow notch 61 resting high on the bridge of the nose and lower holding edges 55 fitting into the orbito-temporal fossae. Edge 55 is cut at an optimum angle of 45° ± about 5° (Angle D in FIGS. 7 and 9) allowing the device to be held securely in a position somewhat higher on the head and at a greater angle with the face than when used as sunglasses. It will be seen that in the sunshade position the device filters completely only those light rays entering the eye at and above eye-level.

Figure 12:
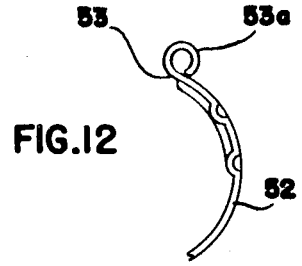
FIG. 12 is a fragmentary plan view of a variation of the embodiment shown in FIG. 7.

Various shapes and sizes of nose indentations 54 are contemplated in order to fit all faces. A rounded collar of plastic or rubber may be attached along the edge of the nose indentation to add comfort for the wearer. Similarly, a roll or small cylinder of plastic or rubber 53a may be formed on or attached to edge 53 to make contact with the head less noticeable, as shown in FIG. 12, where the end of the device is extended and rolled 360° to produce the cylinder.

Figure 13:
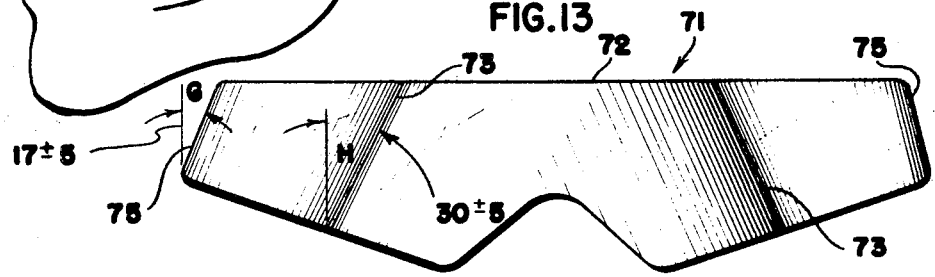
FIG. 13 is a front elevational view of a fourth embodiment of the invention.
Figure 14:
FIG. 14 is a plan view of the device shown in FIG. 13.

FIGS. 13 and 14 illustrate another embodiment 71 of the present invention generally similar to the previous embodiments but utilizing ridge 73, set at an angle 30° ± about 5° with the vertical (Angle H of FIG. 13). Each ridge 73 is located 11/16 inch ± about ¼ inch from upper holding edges 75, which are cut at an angle of 17° ± about 5° (Angle G of FIG. 13) for the reasons discussed hereinbefore. The portion of the band 72 intermediate the ridge 73 and the holding edge 75 is arcuate in shape, being curved outwardly to form a clamp which fits over the zygomatic process 27 and is in gripping contact with the skin on both sides thereof, as best seen in FIG. 14. A somewhat more secure base is hereby created which further stabilizes the device on the wearer's head. Despite the provision of the ridges 73, this embodiment can be provided with a memory that will coil into a spiral for convenient storage with a cylindrical case.

Figure 15:
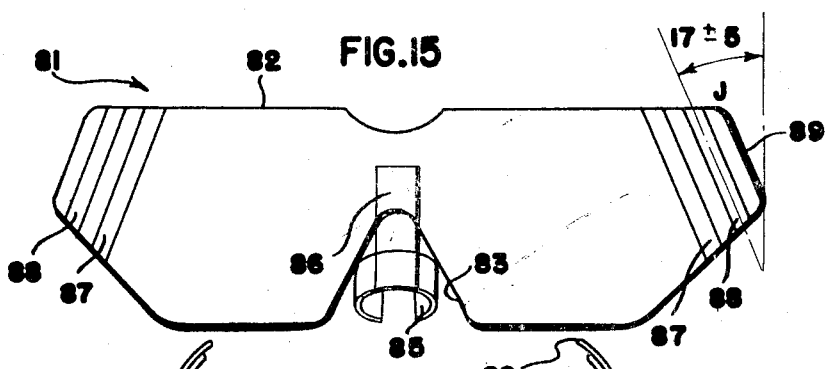
FIG. 15 is an elevational view of a fifth embodiment of the present invention.
Figure 16:
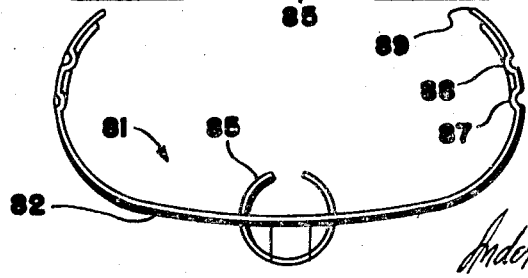
FIG. 16 is a plan view of the device shown in FIG. 15.

FIGS. 15 and 16 illustrate a device 81 that constitutes still another embodiment of the present invention which incorporates two additional features. The device 81 basically includes a band 82 provided with an indentation 83 to accommodate the nose. An auxiliary nose anchor 85 is provided which is fastened by means of flexible tape 86 at the location of the indentation 83. A small piece of material, from which the nose anchor is formed, may also be bonded between the nose anchor and the device itself to attach the nose anchor in its correct position. The nose anchor 85 is preferably formed as an open circular band of flexible thermoplastic material approximately one-fourth to three-fourth inch wide and 1 to 2 inches in circumference. The anchor 85 is formed with a memory that causes it to clamp over the bridge of the wearer's nose. The anchor 85 adds further stability to the device 81 by this auxiliary attachment to the nose, which stability might be desirable for certain sports, such as skiing or horseback riding.

Secondly, optional ridges 87 and 88, similar to the ridges 57 and 59 depicted in FIGS. 7 and 8, are molded in the temporal areas of the device. The ridges 87, 88 are each at an angle of 17° ± about 5° from the vertical (Angle J in FIG. 15) and parallel to adjacent upper holding edges 89. The ridges are spaced approximately one-eighth to one-fourth inch from each other and from edge 89, and their provision allows a single device 81 to accommodate different sized heads by utilizing the clamping action of either edges 89, the ridges 88 or the ridges 87 behind the zygomatic process on each side of the wearer's head.

A combination of ridges 57, 59 (shown in FIGS. 7–9) and ridges 87, 88 (shown in FIGS. 15 and 16) may be provided in order that a single device may be tilted up using ridges 57, 59 for use as a sunshade or be drawn tighter with ridges 87, 88 depending on the wishes of the wearer.

Embodiment 81 is still capable of recoiling into a spiral for convenient storage despite the inclusion of nose anchor 85 and ridges 57, 59 or 87, 88.

The invention provides a new and improved device for aiding human vision which is conveniently and stably held in place on the head of the wearer by cooperation with the osseous fossae. The device is susceptible of simple and economical one-piece construction and a design that readily accommodates variations between the head shapes of different individuals without the need for personal shaping to an individual wearer. Moreover, the device is anchored in position in the natural recesses of the skull, and if desired, small pads or rolls of plastic or rubber may be attached to or formed on the ends of the terminal portions to provide even more stability and comfort. The device is durable and substantially unbreakable, and it is susceptible of quick, convenient storage in a carrying container small enough to be slipped into the pocket of the wearer. Moreover, the device 11, the device 51 when used in its normal upright position, and the devices 71, 81 are considered to be excellently suited for use in lieu of sunglasses because their construction is such that they not only give protection against the rays of the sun or artificial bright lights which would enter from the regions forward of the eye, but they also protect against rays which would enter from the sides, as a result of their wraparound construction.

The wraparound effect minimizes the distortion of light rays for it approaches the curvature of the eyeball (radius 6 to 8 diopters) and avoids the prismlike effect caused by the lateral aspects of flat lenses. The device 51 is specifically designed to serve as a sunshade when worn in an inverted position.

Various of the features of the invention are set forth in the claims which follow.

What is claimed is:

1. A glare-reducing plastic device, which device comprises an elongated sheetlike member of flexible material which is transparent and of a color sufficient to shade the eyes from the brightness and harmful rays of sunlight and artificial light, said flexible member having a memory sufficient to bias it to coil it into a hollow cylinder roll shape having an outer diameter between about one-half inch and 2½ inches whenever said member is untensioned, said member having a pair of end portions which are shaped to fit in the orbito-temporal fossae formed by the zygomatic and frontal bones of the human head and curved sufficiently to reside just behind the zygomatic process, and said flexible member having a length sufficient to span the face of the wearer and a width sufficient to extend vertically above and below the perimeter of the wearer's eyes, a portion of said member intermediate the ends thereof being removed to provide an indentation in the lower edge of said member to accommodate the nose of the wearer.

2. A device in accordance with claim 1 wherein said end portions have upper holding edges extending downward and outward from the upper edge of said member at an angle with the vertical of 17° ± about 5°.

3. A device in accordance with claim 2 wherein said end portions also have lower holding edges extending upward and outward from said lower edge of said member at an angle of 45° ± about 5°, which lower holding edges fit into the orbito-temporal fossae of the wearer when the device is worn inverted as a sunshade.

4. A device in accordance with claim 2 wherein at least one ridge is formed in said member adjacent and parallel to said upper holding edge formed at an angle of 17° ± about 5° with the vertical, thereby facilitating the adjustment of the size of said device on the head of the wearer.

5. A device in accordance with claim 2 wherein at least one ridge is formed in said member generally adjacent each of said upper holding edges at an angle within the range of 25° to 50° to the vertical, thereby facilitating adjustment of the wearing angle on the head.

6. A device in accordance with claim 2 wherein a small roll toward the exterior surface of said flexible member is formed at said upper holding edge of said member thereby increasing the wearer's comfort at the point of contact between said roll and the wearer's head.

7. A device in accordance with claim 1 wherein a nose anchor in the form of an open, circular memory-retaining band of flexible thermoplastic material is flexibly attached within said nose indentation along the lower edge of said member thereby allowing said anchor to be clamped to the nose of the wearer thereby further stabilizing the device on the wearer's head.

8. A device for aiding human vision, which device comprises an elongated sheetlike member of flexible material, said flexible member having a memory sufficient to bias it to coil it into a hollow cylinder roll shape whenever said member is untensioned, said member having a pair of end portions which are shaped to fit in the orbito-temporal fossae formed by the zygomatic and frontal bones of the human head and curved sufficiently to reside just behind the zygomatic process, said flexible member having a length sufficient to span the face of the wearer and a width sufficient to extend vertically above and below the perimeter of the wearer's eyes, a portion of said member intermediate the ends thereof being removed to provide an indentation in the lower edge of said member to accommodate the nose of the wearer, and said flexible member having an opaque region located in the path of vision of the wearer and a plurality of apertures in said opaque region between about 0.025–0.036 inch in diameter.

9. A device in accordance with claim 8 wherein said apertures are provided in rows spaced apart between about 0.1 inch and 0.17 inch.

10. A device in accordance with claim 8 wherein said end portions have upper holding edges extending downward from the upper edge of said member at an angle with the vertical of 17° ± about 5°.

UNITED STATES PATENT OFFICE
CERTIFICATE OF CORRECTION

Patent No. 3,614,216            Dated   October 19, 1971

Inventor(s)    Sol Roy Rosenthal

It is certified that error appears in the above-identified patent and that said Letters Patent are hereby corrected as shown below:

Column 4, line 22, "proportional" should be "proportioned".

Column 4, line 70, "11/16" should be "1-1/16".

Signed and sealed this 18th day of April 1972.

(SEAL)
Attest:

EDWARD M. FLETCHER, JR.　　　　ROBERT GOTTSCHALK
Attesting Officer　　　　　　　Commissioner of Patents